Figure 1:
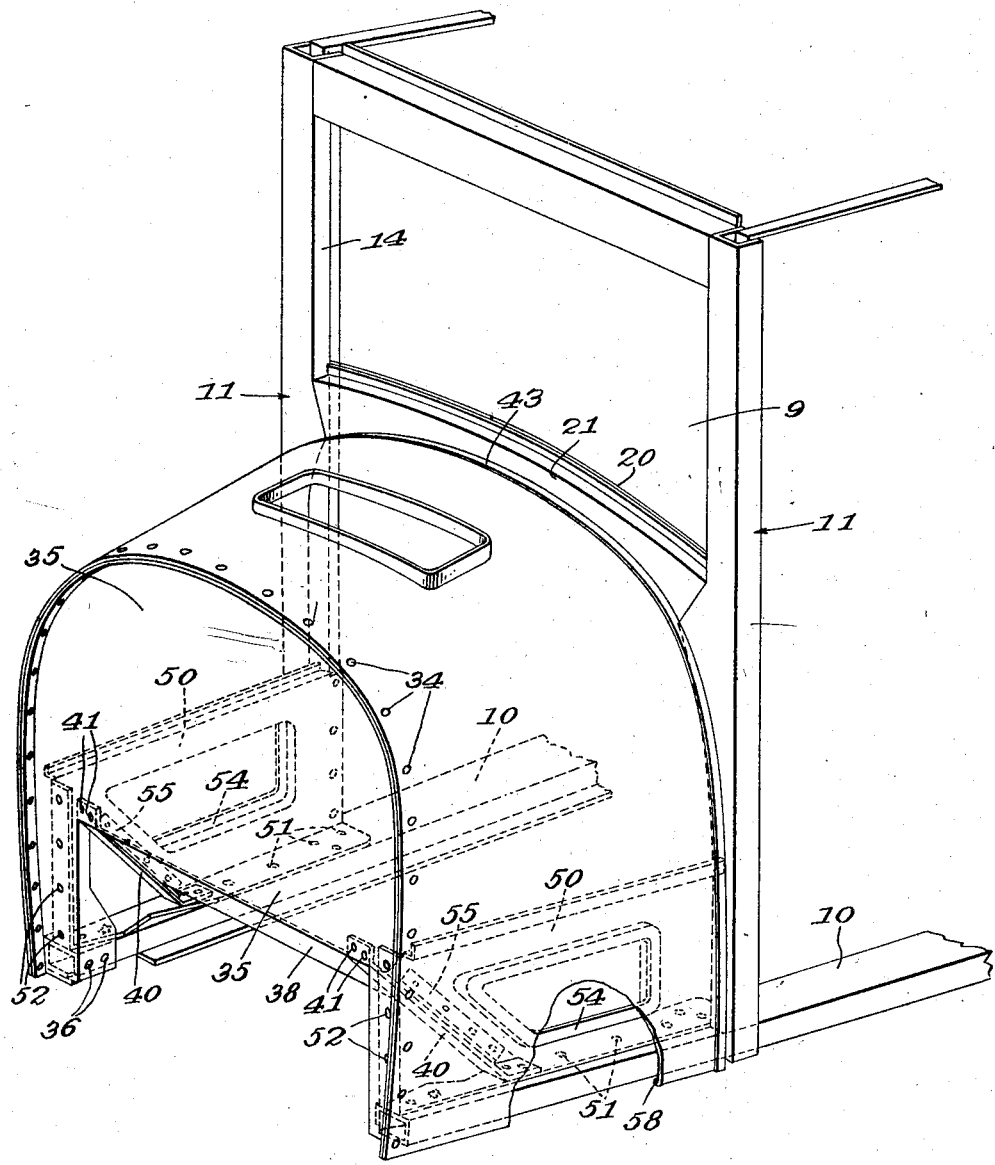

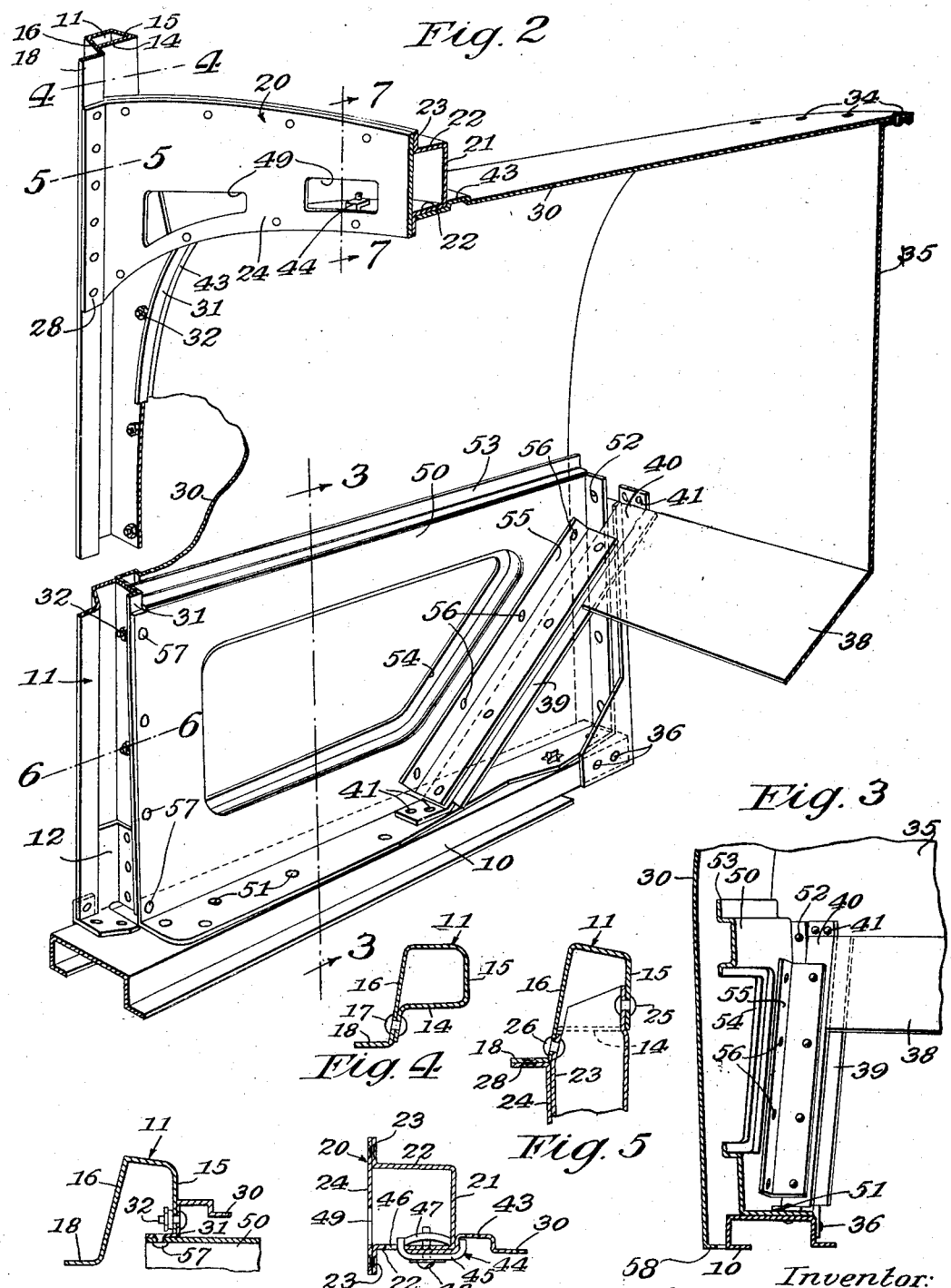

Patented July 7, 1931

1,813,400

UNITED STATES PATENT OFFICE

OTTO J. GROEHN, OF GROSSE POINTE PARK, MICHIGAN, ASSIGNOR TO HUDSON MOTOR CAR COMPANY, OF DETROIT, MICHIGAN, A CORPORATION OF MICHIGAN

AUTOMOBILE BODY CONSTRUCTION

Application filed March 2, 1928. Serial No. 258,615.

This invention relates to automobile bodies and particularly to bodies of the frameless type in which the external form of the body is determined, and much of its strength afforded, by an assembly of preformed exterior panels, as distinguished from bodies of the composite type employing a complete, articulated, rigid frame structure around which exterior body panels are shaped and which takes the stresses and strains.

The invention has as its general object an improved construction for supporting the body paneling whereby greater rigidity is obtained and the effect of weaving of the chassis frame and body, and the consequent tendency of the body to creak and rattle, reduced to a minimum.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and that it is not intended to limit the invention beyond the terms of the several claims hereto appended or the requirements of the prior art.

The invention will be more clearly understood from the following description in conjunction with the accompanying drawings; in which, Fig. 1 is a fragmentary perspective view, partly broken away, of the front end portion of an automobile body embodying the invention;

Fig. 2 is an enlarged sectional perspective view, looking from the interior of the body and partly broken away, of a portion of the structure shown in Fig. 1;

Figs. 3, 4, 5, 6, and 7 are sectional views taken on the lines 3—3, 4—4, 5—5, 6—6, and 7—7, respectively, Fig. 2.

A type of automobile body embodying the invention as illustrated in the drawings comprises longitudinal body sills 10 upon the top surface of which front pillars 11 are secured by brackets 12. The pillars 11, preferably, are of channel shape with the web facing outwardly and the front leg 15 (Fig. 2) and the rear leg 16 extending inwardly. The front leg of that portion of each pillar which forms the side of the windshield opening 9 is provided with a rearwardly extending flange 14 which is secured to the rear leg 16 in any suitable manner, as by rivets 17 (Fig. 4), to close the opening in the channel. The rear leg 16 is provided with a rearwardly extending flange 18 which serves as a door jamb. A belt panel 20 extends between opposite pillars 11 and is composed of a channel member 21 positioned with its legs 22 extending rearwardly and provided at their ends with oppositely disposed flanges 23 to which a plate 24 is secured, as by spot welding. The ends of the channel 21 are reduced and enter the pillars 11, the web being secured to the forward legs 15 of the pillar as by rivets 25 (Fig. 5), and the flanges 23 secured to the rear legs 16 as by rivets 26. The ends of the plate 24 are provided with rearwardly extending flanges 28, which are secured to the flanges 18, as by spot welding.

While not limited to use in this particular relation, the invention is herein illustrated in connection with the mounting of the cowl panel 30 which is, as shown, provided at its rear edge with a flange 31 (Figs. 2 and 6) shaped around the forward legs 15 of the pillars 11 to which it is secured as by bolts 32. The forward edge of the cowl panel is secured as by rivets 34 to a dash 35, the lower side portions of which are fastened as by rivets 36 to the sills 10. The lower central portion of the dash is folded to extend inwardly and downwardly, as shown at 38, to form the upper fixed member of the toe board. Toe board supports 40 extend between the dash 35 and the sills 10 and are secured thereto as by rivets 41. The supports 40 are formed at their inner edges with flanges or ledges 39 for supporting the ends of the fixed member 38 and the removable members (not shown) of the toe board.

An offset beading 43 (Figs. 2 and 7) is formed in the cowl 30 adjacent the pillars 11 and the belt panel 21 to form a tight connection therewith and to provide space for clamps 44 which secure the rear top edge of the cowl to the belt panel. Each of the clamps 44 comprises a clamping member 45 having hooked ends engaging respectively with the beading 43 and through openings 46 in the lower leg of the channel 21, an upper cooperating clamping member 47 and a screw or bolt 48 connecting said clamping members and extending through openings in the interposed members. In order to facilitate the assembly of the clamps 44, the plate 24 is provided with openings 49.

It has been common practice heretofore in constructions of this type to provide the lower side edges of the cowl and similar panels with inturned flanges which were secured at intervals throughout their length to the body sills. In accordance with the present invention such connection between the cowl and body sills is avoided and the lower edges 58 of the cowl left entirely free from the body sills. In order to render the body more rigid, a bracket 50 is secured to each of the body sills 10, as by rivets 51, and extends between the panel supports, such as the pillars 11 and dash 35 and is connected thereto. As shown, the front end of each bracket 50 is secured to the dash 35 by rivets 52, while its rear end is secured by rivets 57 to the flange 31 of the cowl panel which, in turn, is secured to the pillars 11, as above described. If desired, the bracket 50 may be stiffened by outwardly and upwardly turned flanges 53 and 54. The bracket 50 and the toe board supports 40 may be secured together, and for this purpose, as illustrated, an angle iron 55 extends therebetween and is secured thereto in any suitable manner, as by rivets 56. In this manner is provided a cowl or other body panel which floats relative to the body sills but is co-extensive and out of contact therewith, thereby minimizing the creaks and rattles ordinarily coming from these regions due to the weaving of the chassis frame and body as the result of irregular road conditions. At the same time the body structure as a whole is reinforced and rendered sturdier.

I claim:

1. In an automobile body, in combination, a body sill structure, uprights secured to and supported by said sill structure, a reinforcing bracket connecting said uprights and secured at its lower edge to said sill structure and a panel secured to and supported by said uprights and having its lower edge free from said sill structure.

2. In an automobile body, in combination, a body sill, a dash and a pillar secured to and supported by said sill, a reinforcing bracket secured at its ends to said dash and pillar and at its lower edge to said sill, and a cowl secured at its ends to and supported by said dash and pillar and having its lower edge free from said sill.

3. In an automobile body, in combination, a body sill, a dash and a pillar secured to and supported by said sill, a reinforcing bracket secured at its ends to said dash and pillar and at its lower edge to said sill, a toe board support secured at its ends to said dash and sill and connected intermediate its ends with said bracket, and a cowl secured at its ends to and supported by said dash and pillar and having its lower edge free from said sill.

4. In an automobile body, the combination of a pair of body sills, a pillar mounted on each of said sills, a dash secured to said sills at points spaced from said pillars, a cowl secured at its forward and rear edges to said dash and pillars respectively and with its side edges extending to points co-extensive but out of contact with said sills, and a bracket secured to each sill and connecting each of said pillars with said dash.

In testimony whereof I affix my signature.

OTTO J. GROEHN.